US012248279B2

(12) United States Patent
Stranczl et al.

(10) Patent No.: US 12,248,279 B2
(45) Date of Patent: Mar. 11, 2025

(54) IMPACT STRIKING MECHANISM, IN PARTICULAR FOR TIMEPIECES

(71) Applicant: Montres Breguet S.A., L'Abbaye (CH)

(72) Inventors: Marc Stranczl, Nyon (CH); Polychronis Nakis Karapatis, Premier (CH)

(73) Assignee: Montres Breguet S.A., L'Abbaye (CH)

( * ) Notice: Subject to any disclaimer, the term of this patent is extended or adjusted under 35 U.S.C. 154(b) by 372 days.

(21) Appl. No.: 17/836,407

(22) Filed: Jun. 9, 2022

(65) Prior Publication Data

US 2022/0397863 A1 Dec. 15, 2022

(30) Foreign Application Priority Data

Jun. 15, 2021 (EP) .................................... 21179616

(51) Int. Cl.
*G04B 21/06* (2006.01)
*G04B 23/02* (2006.01)

(52) U.S. Cl.
CPC ........... *G04B 21/06* (2013.01); *G04B 23/026* (2013.01)

(58) Field of Classification Search
CPC .............................. G04B 21/06; G04B 23/026
See application file for complete search history.

(56) References Cited

U.S. PATENT DOCUMENTS 2,948,105 A 8/1960 Levy
3,777,701 A * 12/1973 Nofziger ................ G04B 21/06 116/169
2009/0059736 A1 3/2009 Moteki et al.
2012/0147715 A1* 6/2012 Karapatis ............. G04B 23/028 368/267
2012/0155227 A1* 6/2012 Karapatis ............. G04B 23/026 368/243
2012/0195174 A1* 8/2012 Goeller .................. G04B 21/06 368/243
2016/0299472 A1* 10/2016 Legeret ................ G04B 23/023
(Continued)

FOREIGN PATENT DOCUMENTS

CN 101093385 A 12/2007
CN 101382771 A 3/2009
(Continued)

OTHER PUBLICATIONS

European Search Report No. 21 17 9616 dated Nov. 9, 2021.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

An impact striking mechanism (1), in particular for a horological movement (3), the mechanism (1) including at least one resonant element (5) enabling a sound to be emitted when it is struck, and a hammer (8) capable of moving between a rest position (9) and a strike position (11) in which it strikes the resonant element (5) in order to cause it to vibrate, characterised in that it comprises a system for actuating the hammer (8) including a movable impactor (16, 17, 18) configured to move from a release position (19) to an impact position (21), in which it at least partially transmits the momentum thereof to the hammer (8) to move it from the rest position (9) thereof to the strike position (11) thereof in order to cause the resonant element (5) to vibrate.

14 Claims, 2 Drawing Sheets

(56) References Cited

U.S. PATENT DOCUMENTS

| | | | | |
|---|---|---|---|---|
| 2018/0113423 | A1* | 4/2018 | Di Domenico | G04B 15/06 |
| 2018/0373201 | A1* | 12/2018 | Tu | G04B 15/10 |
| 2019/0179266 | A1* | 6/2019 | Kissling | G04B 25/00 |
| 2019/0294116 | A1* | 9/2019 | Jung | G04B 21/06 |
| 2020/0183333 | A1* | 6/2020 | Stranczl | G04B 31/02 |

FOREIGN PATENT DOCUMENTS

| | | | |
|---|---|---|---|
| CN | 106054574 | A | 10/2016 |
| EP | 2 034 375 | A1 | 11/2009 |
| EP | 2 290 480 | A1 | 3/2011 |
| EP | 3 663 869 | A1 | 6/2020 |
| JP | 2010-19823 | A | 1/2010 |
| JP | 2020-91287 | A | 6/2020 |
| WO | 2012/151710 | A1 | 11/2012 |

* cited by examiner

IMPACT STRIKING MECHANISM, IN PARTICULAR FOR TIMEPIECES

CROSS REFERENCE TO RELATED APPLICATION

This application claims priority to European Patent Application No. 21179616.4 filed on Jun. 15, 2021, the entire contents of which are incorporated herein by reference

TECHNICAL FIELD OF THE INVENTION

The invention relates to an impact striking mechanism, in particular for timepieces.

The invention further relates to a horological movement including such a striking mechanism.

TECHNOLOGICAL BACKGROUND

In the horological field, a striking mechanism can be combined with a conventional horological movement in particular to act as minute repeaters or to signal a scheduled alarm time. Such a striking mechanism typically comprises at least one gong made of sapphire, quartz or a metallic material, such as steel, bronze, precious metal or metallic glass. This gong can describe, for example, at least one portion of a circle around the horological movement in the watch frame. The gong is fixed via at least one of the ends thereof to a gong holder, which is itself integral with a watch plate. A hammer of the mechanism is mounted such that it can rotate on the plate, for example in the vicinity of the gong holder, so as to strike the gong to cause it to vibrate. The sound produced by the gong struck by the hammer lies in particular in the audible frequency range from 1 kHz to 20 kHz. This allows the wearer of the watch to be informed of a specific time, a scheduled alarm or a minute repetition.

As shown in the European patent document No. 1 574 917 A1, the striking mechanism of a watch can comprise two or more gongs fixed via one of the ends thereof to one and the same gong holder, which is itself integral with a plate. Each gong can be struck by a respective hammer. For this purpose, each hammer is driven by its own drive spring, which has to be armed beforehand, so as to drive the hammer against the gong, in order to signal a minute repetition or an alarm time. Two damping counter-springs are each provided to repel and hold the two hammers away from the gongs in a rest mode. In a striking mode, the damping counter-springs act with great force and slow down the fall of each hammer before it strikes the respective gong. These counter-springs allow each hammer to be repelled into the rest position thereof after the strike. Eccentrics are also provided for adjusting the operation of the counter-springs to essentially prevent each hammer from rebounding from the respective gong.

One drawback of such a structure of the striking mechanism with these counter-springs is that a significant amount of the kinetic energy of the hammer is lost when striking the respective gong, which reduces the sound level of the strike. This energy loss is largely due to the slowing down imposed by each counter-spring in the path of the hammer as it strikes the gong. Moreover, even if the pre-arming of the drive springs is increased, this implies adapting the counter springs via the eccentric thereof to also prevent any rebound, which is another drawback of such a striking mechanism.

SUMMARY OF THE INVENTION

The purpose of the invention is thus to overcome the drawbacks of the aforementioned prior art by providing a striking mechanism of a timepiece, with the aim of preventing significant loss of energy when the hammer falls against the gong.

For this purpose, the invention relates to a striking mechanism, in particular for timepieces, the mechanism including at least one resonant element enabling a sound to be emitted when it is struck, and a hammer capable of moving between a rest position and a strike position in which it strikes the resonant element in order to cause it to vibrate.

The mechanism is noteworthy in that it comprises a system for actuating the hammer including a movable impactor configured to move from a release position to an impact position, in which it transmits a momentum to the hammer to move it from the rest position thereof to the strike position thereof in order to cause the resonant element to vibrate.

Thus, the momentum provided by an impactor is used to operate the hammer. Due to the momentum of the impactor, the hammer receives enough energy to strike the gong and cause it to vibrate. Moreover, by selecting a particular difference in mass between the hammer and the impactor, the speed of the hammer can be adapted. For example, a hammer with a lower mass can be chosen, which moves to strike the gong with a higher speed than the impactor with a higher mass.

This striking mechanism leads to savings in the energy required to operate the hammer. Moreover, a lighter, faster-moving hammer reduces the risk of rebound after the strike against the gong.

According to one specific embodiment of the invention, the mechanism includes a magnet which is fixed relative to the horological movement, the magnet being configured to attract the movable impactor into an impact position.

According to one specific embodiment of the invention, the hammer comprises a magnetically conductive material.

According to one specific embodiment of the invention, the impactor comprises a magnetically conductive material so as to be attracted by the magnet.

According to one specific embodiment of the invention, the hammer is in contact with the magnet in the rest position thereof.

According to one specific embodiment of the invention, the impactor is configured to impact the magnet in order to impart a pulse to the hammer.

According to one specific embodiment of the invention, the distance between the release position of the impactor and the magnet is chosen such that the magnet attracts the impactor against it in the impact position thereof.

According to one specific embodiment of the invention, the momentum transmitted by the impactor is high enough to overcome the retaining force of the magnet acting on the hammer, such that the hammer detaches from the magnet and strikes the resonant element.

According to one specific embodiment of the invention, the mechanism comprises a flexible guide on which the hammer is mounted to enable it to move between the rest position thereof and the strike position thereof.

According to one specific embodiment of the invention, the flexible guide is configured to press the hammer against the magnet.

According to one specific embodiment of the invention, the actuation system comprises a flexible guide on which the impactor is mounted to enable it to move between the release position and the impact position.

According to one specific embodiment of the invention, the flexible guide includes a flexible strip or a flexible neck.

According to one specific embodiment of the invention, the actuation system comprises a rotary device equipped with the impactor, the rotary device being configured to bring the impactor into the release position.

According to one specific embodiment of the invention, the actuation system comprises at least one additional impactor, preferably two additional impactors, arranged on the rotary device, so as to alternately bring each impactor into the release position.

According to one specific embodiment of the invention, the rotary device comprises a rotary hub.

According to one specific embodiment of the invention, the rotary device comprises at least one arm, with each arm bearing an impactor.

According to one specific embodiment of the invention, the rotary device comprises a plurality of arms angularly distributed around the hub.

According to one specific embodiment of the invention, the mass of the impactor is greater than that of the hammer, for example, the mass of the impactor is at least twice that of the hammer.

The invention further relates to a horological movement including such a striking mechanism.

BRIEF DESCRIPTION OF THE FIGURES

Other specific features and advantages will be clearly observed in the following description, which is given as a rough guide and in no way as a limiting guide, with reference to the accompanying drawings, wherein.

DETAILED DESCRIPTION OF THE INVENTION

Figure 1:
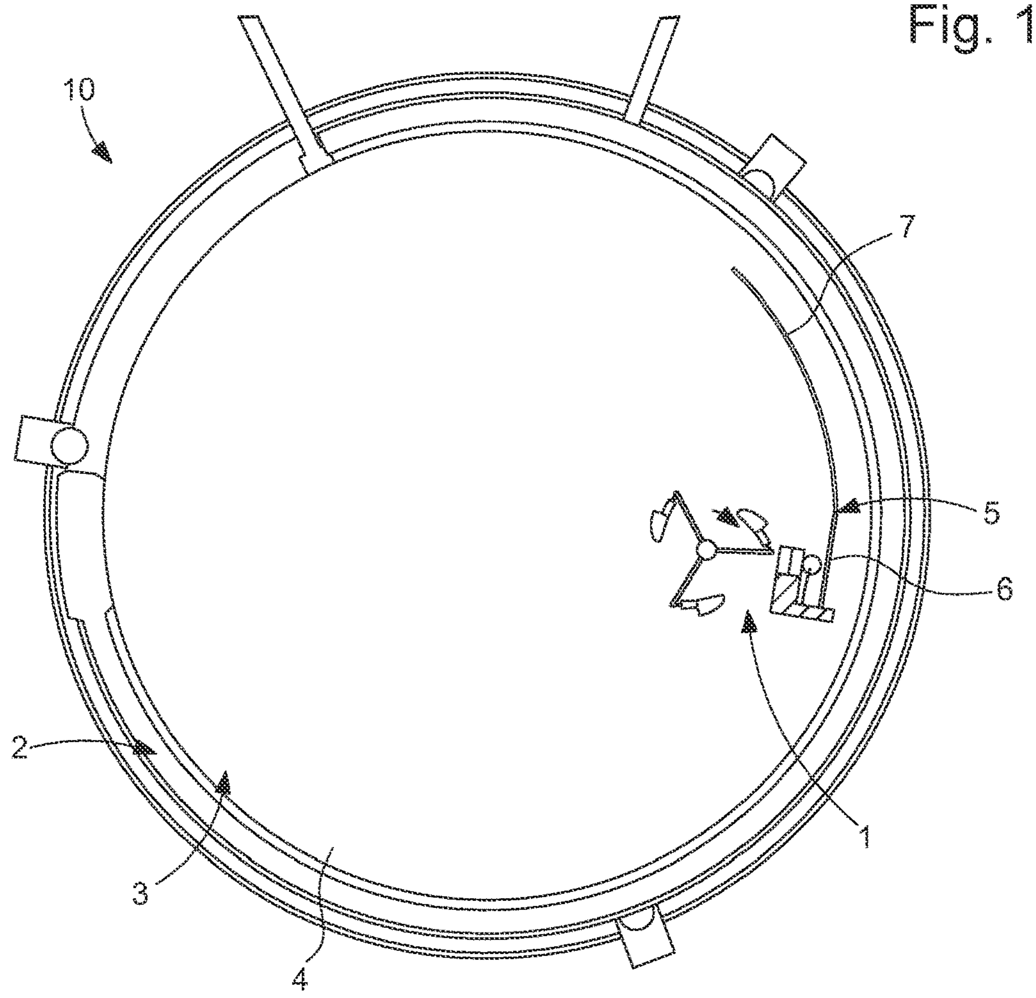
FIG. 1 is a diagrammatic view of a timepiece including an impact striking mechanism according to one embodiment of the invention.
Figure 2:
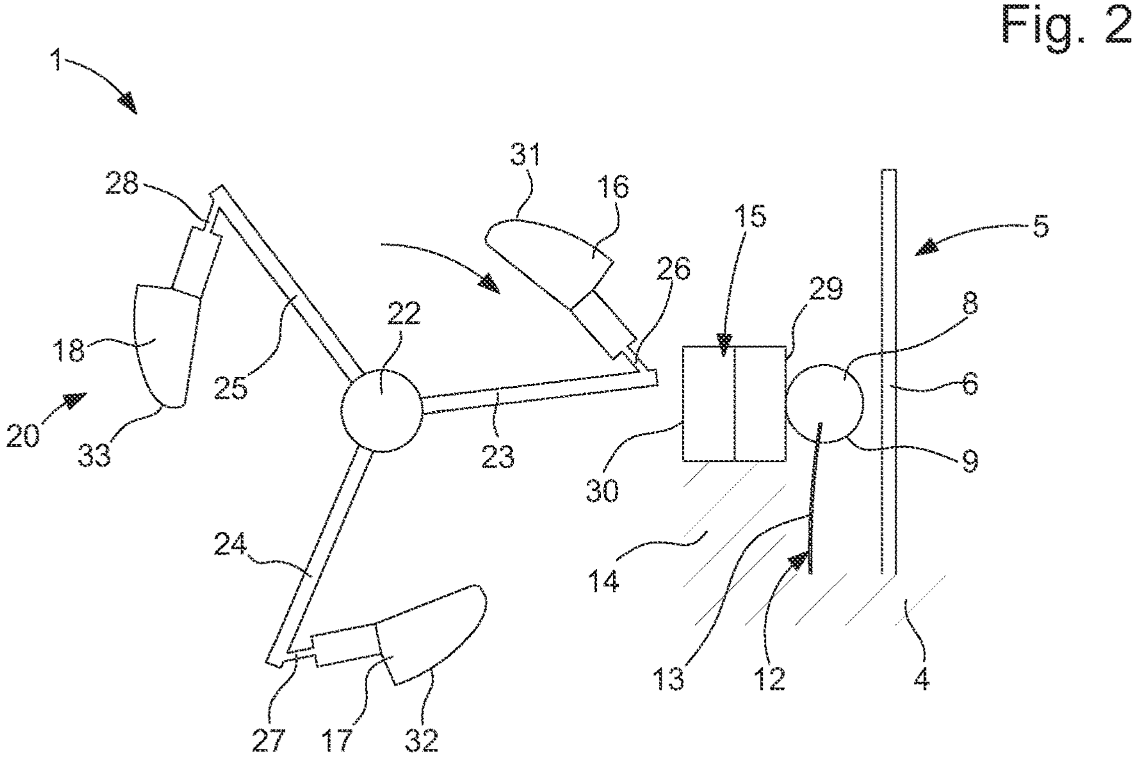
FIG. 2 is an enlarged diagrammatic view of the striking mechanism in FIG. 1.

As explained hereinabove, the invention relates to an impact striking mechanism 1. The striking mechanism 1 is intended for a timepiece 10, such as a watch shown in FIG. 1. The timepiece 10 comprises a middle 2 and a horological movement 3, preferably a mechanical movement, which is for example provided with a plate 4 and a barrel spring to supply the operating energy. The embodiment described hereinbelow is based on the combination of the "Gaussian magnetic cannon" principle and the principle of conservation of momentum during a collision.

In FIGS. 1 to 5, the striking mechanism 1 comprises a resonant element 5, for example a gong conventionally used in horological striking mechanisms. The resonant element 5 allows a sound to be emitted when struck. In the figures, the resonant element 5 is a rod comprising a rectilinear portion 6. The resonant element 5 is preferably fixed to the plate 4, so as to extend above and beside the plate 4, for example in a plane parallel to that of the plate.

Other configurations of the resonant element 5 are possible. The resonant element 5 can further comprise a circular portion 7, shown in FIG. 1, in particular running along the inner face of the middle 2.

To emit a sound, the mechanism 1 comprises a hammer 8 that is capable of moving relative to the plate 4. The hammer 8 is capable of moving between two positions, a rest position 9 away from the resonant element 5, and a strike position 11 in which it strikes the resonant element to cause it to vibrate. Thus, the resonant element 5 produces a vibration that propagates through the watch. The outer part of the watch radiates these vibrations such that a sound is emitted. Other embodiments are possible with various forms for the hammer 8 and the resonant element 5.

The mechanism 1 in this case comprises a flexible guide 12 on which the hammer 8 is mounted to allow it to move between the rest position 9 thereof and the strike position 11 thereof. The flexible guide 12 preferably comprises a first flexible strip 13 assembled with the plate 4 on the one hand, and with the hammer 8 on the other hand. The first flexible strip 13 is preferably arranged substantially parallel to the resonant element 5 when the hammer 8 is in the rest position 9. Through the elastic deformation of the first flexible strip 13, the hammer 8 moves from the rest position 9 into the strike position 11 and vice versa.

The mechanism 1 further includes a magnet 15 that is fixed relative to the plate 4. The magnet 15 is preferably assembled on the plate 4. The magnet 15 is, for example, disposed on a promontory 14 facing the resonant element 5.

Preferably, the magnet 15 is configured to retain the hammer 8 in the rest position 9 thereof. For this purpose, the hammer 8 includes a magnetically conductive material, which induces an attractive force on the hammer 8 against the magnet 15.

Alternatively, a hammer 8 can be chosen that does not comprise any magnetically conductive material. In such a case, the flexible guide 12 is configured to apply a prestressing to the hammer 8, so as to press it against the magnet 8.

Thus, in the rest position 9, the hammer 8 is in contact with a front face 29 of the magnet 15. The hammer 8 remains in this position at all times, except in the moments when it strikes the resonant element 5. The flexible guide 12 is assembled to the plate 4 between the promontory 14 and the resonant element 5. Thus, the hammer 8 can move between the magnet 15 and the resonant element 5 thanks to the flexible guide 12.

The front face 29 preferably has a substantially planar surface. The hammer 8 has, for example, a cylindrical or spherical shape. These rounded shapes make it easier to separate the hammer 8 from the front face 29 of the magnet 15.

According to the invention, the mechanism 1 comprises a system for actuating the hammer 8. This mechanism is configured to cause the hammer 8 to move from the rest position 9 thereof to the strike position 11 thereof. In particular, it serves to separate the hammer 8 from the magnet 15 and allow it to reach the resonant element 5.

To this end, the actuation system 20 includes at least one movable impactor 16, 17, 18 configured to transmit to the hammer 8 a sufficient momentum to move it from the rest position 9 thereof to the strike position 11 thereof and to cause the resonant element 5 to vibrate.

The impactor 16, 17, 18 is configured to move from a release position 19 into an impact position 21 wherein it transmits a momentum to the hammer 8.

In the embodiment shown in FIGS. 1 to 5, the actuation system comprises a rotary device 20 provided with three movable impactors 16, 17, 18.

The rotary device 20 comprises a hub 22 and three arms 23, 24, 25, which are angularly distributed around the hub 22 and are connected to the hub 22 by one end. Each arm 23, 24, 25 bears a movable impactor 16, 17, 18 disposed at the opposite end of the arm 23, 24, 25 relative to the hub 22. The arms 23, 24, 25 are preferably arranged in the same plane substantially perpendicular to the axis of the hub 22. This plane preferably further passes through the magnet 15, the hammer 8 and the resonant element 5.

Each movable impactor 16, 17, 18 is mounted on an arm 23, 24, 25 so as to form an angle with the arm 23, 24, 25. The angle is comprised between 30 and 60°, when the movable impactor 16, 17, 18 is in the release position 19, and the angle is comprised between 60 and 90°, when the movable impactor 16, 17, 18 is in the impact position 21. An arm can, for example, be an oblong body, a tooth of a gear train or a small plate.

Preferably, each movable impactor 16, 17, 18 is mounted on the arm 23, 24, 25 by a flexible guide to enable it to move relative to the arm 23, 24, 25, and to switch from the release position 19 into the impact position 21. The flexible guide here includes a second flexible strip 26 assembled to the movable impactor 16, 17, 18 on the one hand and to the end of the arm 23, 24, 25 on the other hand.

Each movable impactor 16, 17, 18 comprises a contact face 31, 32, 33, which is intended to come into contact with the magnet 15, when it moves from the release position 19 into the impact position 21. The contact faces 31, 32, 33 of the movable impactor 16, 17, 18 are preferably rounded, to allow for easier disengagement when the movable impactor 16, 17, 18 returns to the release position thereof.

When the rotary device 20 rotates, it positions one of the movable impactors 16, 17, 18 to face the magnet 15. The movable impactor 16, 17, 18 then moves from the release position 19 into the impact position 21 in a radial movement. Once the impact has been made, the rotary device 20 continues to rotate in order to prevent the movable impactor 16, 17, 18 from remaining against the magnet 15. The geometry of the movable impactors 16, 17, 18 is designed to require as little torque as possible on the rotary device 20. For example, a contact face 32 is chosen that has a gradient tangential to the rotary motion.

The rotary device 20 is actuated by rotating the hub 22 about the axis thereof, such that the arms 23, 24, 25 rotate about the axis of the hub 22. Thus, the movable impactors 16, 17, 18 also rotate about the axis of the hub 22 while remaining in the release position 19. In other words, the movable impactors 16, 17, 18 remain in the same position relative to the arms 23, 24, 25 bearing them.

In order to rotate, the means 22 are mechanically connected to the barrel of the movement via meshing means, not shown in the figures. These meshing means comprise, for example, an actuation system configured to determine the strikes to be executed as a function of the time displayed by the movement 3, in particular to act as minute repeaters or to signal a scheduled alarm time. Thus, when one or more strikes are to be sounded, the actuation system triggers the rotation of the hub 22.

Figure 3:
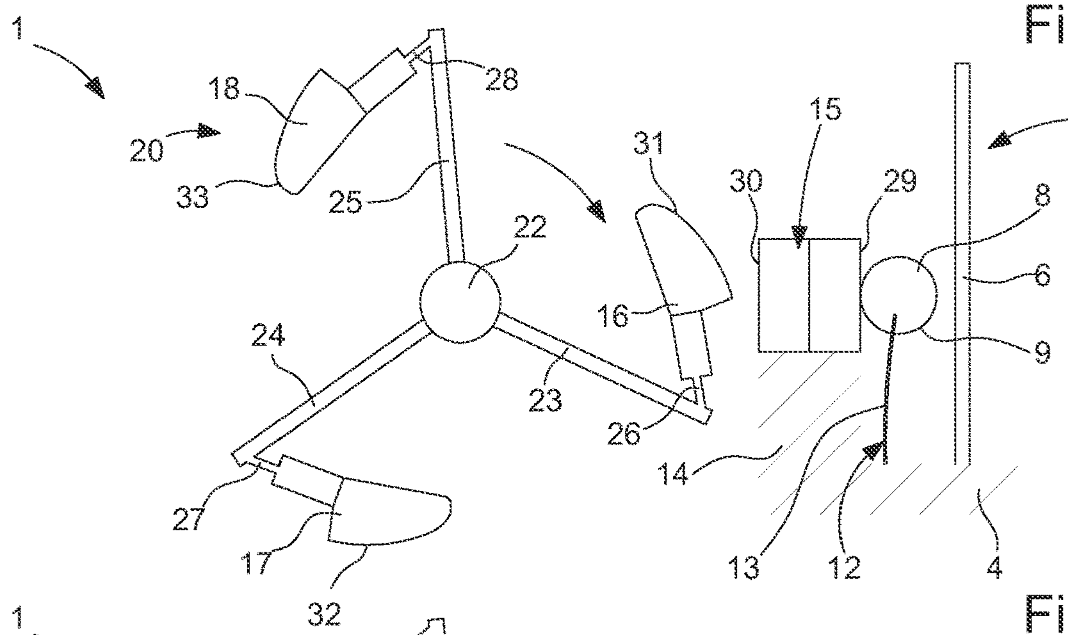
FIG. 3 is a diagrammatic view of the striking mechanism in FIG. 1, showing the impactor in the release position.

The rotary device 20 is configured to bring the impactor into the release position 21 in front of the magnet 15. FIG. 3 shows one example wherein the impactor 21 is in the release position located the closest to the magnet 15. The magnet 15 has an opposite face 30 oriented towards the rotary device 20, such that the opposite face 30 of the magnet 15 and a contact face 31, 32, 33 of a movable impactor 16, 17, 18 are facing one another when the rotary device 20 is rotating. The opposite face 30 preferably has a substantially planar surface.

The attractive force of the magnet 15 and the distance between the contact face 31, 32, 33 of the movable impactor 16, 17, 18 in the release position and the opposite face 30 of the magnet 15 are chosen such that the magnet 15 attracts the impactor 16 against the opposite face 30 thereof, when it passes in front of the opposite face 30 thereof. Thus, the magnetic potential energy produced by the magnet 15 acting on the movable impactor 16, 17, 18 is transformed into kinetic energy by the movable impactor 16, 17, 18. This kinetic energy is transmitted to the hammer 8 through the impact of the movable impactor 16, 17, 18.

More specifically, when the movable impactor 16, 17, 18 is attracted by the magnet 15, it is accelerated and strikes the magnet 15. When the movable impactor 16, 17, 18 collides with the opposite face 30 of the magnet 15, at least a part of the momentum thereof is transmitted to the hammer 8 through the magnet 15, the hammer 8 being disposed against the front face 29 of the magnet in the rest position.

This principle of motion transmission combined with magnetic attraction is known as the "Gaussian cannon". The attraction of the magnet 15 guarantees a minimum intensity for each strike of the hammer 8. The resulting strike is more consistent over the entire duration of the strike, independently of the barrel torque.

Figure 4:
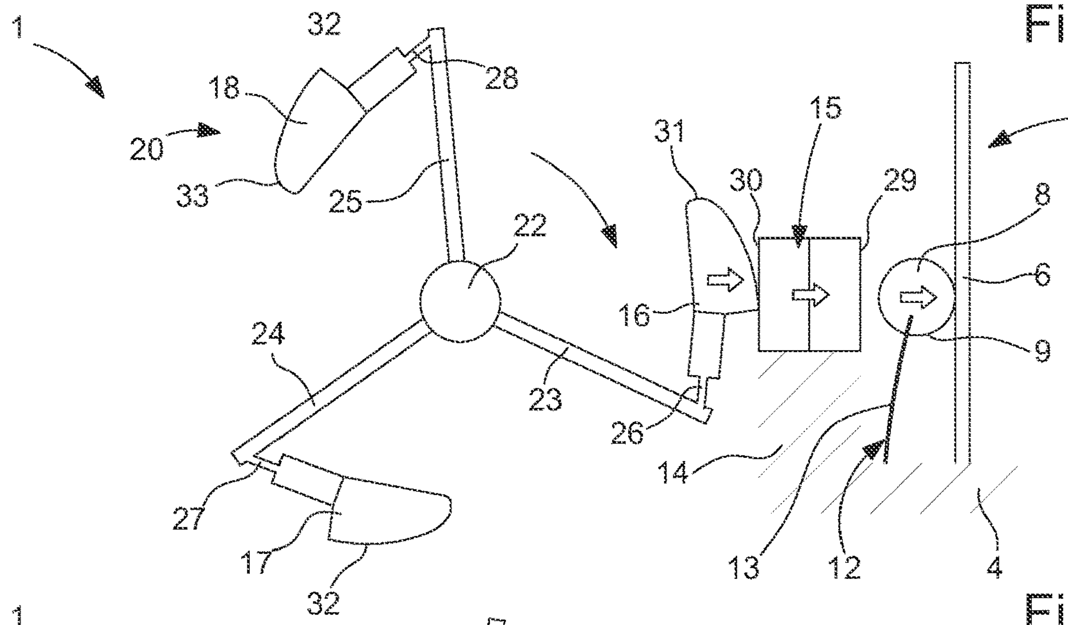
FIG. 4 is a diagrammatic view of the striking mechanism in FIG. 1, showing the impactor in the impact position with the magnet and showing the hammer in the strike position with the gong.

As shown in FIG. 4, each movable impactor 16, 17, 18 is configured to impact the magnet 15 in order to provide a pulse to the hammer.

Moreover, the movable impactors 16, 17, 18 and the rotary device 20 are configured such that the momentum transmitted to the hammer 8 by the impactor 16, 17, 18 is greater than the retaining force of the magnet acting on the hammer 8, such that the hammer detaches from the magnet 15 and strikes the resonant element 5 with sufficient force, as shown in FIG. 4.

Figure 5:
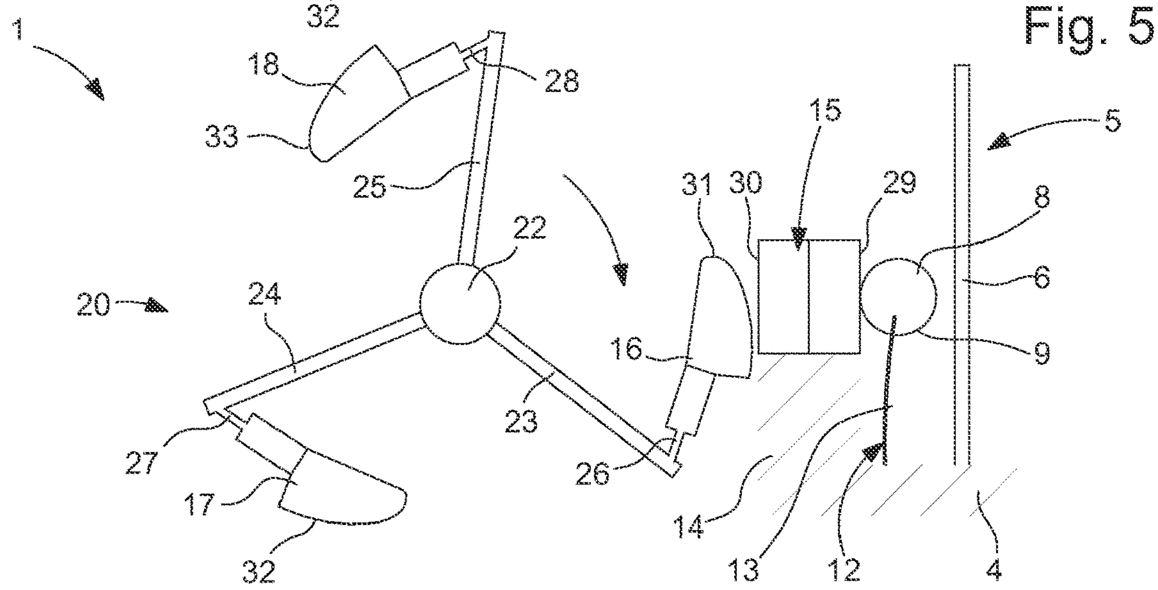
FIG. 5 is a diagrammatic view of the striking mechanism in FIG. 1, showing the impactor no longer in the impact position, nor in the release position, and showing the hammer having returned to the rest position.

As shown in FIG. 5, the magnet 15 and the hammer 8 are further configured so that the front face 29 attracts the hammer 8 against it, after it has struck the resonant element 5. Thus, the hammer 8 returns to the rest position 9 thereof, and can be actuated again by the next movable impactor 16, 17, 18. It further prevents the hammer 8 from rebounding and striking the resonant element 5 again in an unwanted manner.

In the case of a hammer 8 that does not include magnetically conductive material, the flexible guide 12 brings the hammer back against the magnet 15.

As it continues to rotate, the rotary device 20 pulls on the movable impactor 16, 17, 18 such that it detaches from the opposite face 30 of the magnet 15. At the same time, as the hub 22 rotates, the next movable impactor 16, 17, 18 approaches the magnet 15.

The rotation device 20 is actuated by the movement, when a stroke is required. Thus, the stroke sounds automatically thanks to the movable impactors 16, 17, 18, the magnet 15, the hammer 8 and the resonant element 5.

During operation, each movable impactor 16, 17, 18 impacts the magnet 15 one after the other, to produce a sound each time. With each impact of a movable impactor 16, 17, 18, the hammer 8 strikes the resonant element 5, and returns to its rest position 9 against the magnet 15 between two successive impacts.

Depending on the number of strokes to be emitted, the rotation device is actuated over a predefined period of time.

Preferably, the rotation is carried out at a constant speed so that the strokes are periodically emitted at the same frequency.

The rotational speed can also be variable so as to emit a particular stroke.

It goes without saying that the present invention is not limited to the example shown but that various alternatives and modifications that may be apparent to a person skilled in the art can be made thereto. In particular, the device can comprise a greater or lesser number of arms and impactors than those illustrated in the embodiment described.

The invention claimed is:

1. An impact striking mechanism, for a horological movement, comprising:

- at least one resonant element enabling a sound to be emitted when struck;
- a hammer movable between a rest position and a strike position at which the hammer strikes the resonant element in order to cause the resonant element to vibrate;
- a system for actuating the hammer including a movable impactor configured to move from a release position to an impact position, in which the impactor at least partially transmits momentum thereof to the hammer to move the hammer from the rest position to the strike position in order to cause the resonant element to vibrate; and
- a magnet which is fixed relative to the horological movement, the magnet being configured to attract the movable impactor into the impact position.

2. The striking mechanism according to claim 1, wherein the hammer is in contact with the magnet in the rest position thereof.

3. The striking mechanism according to claim 2, wherein the impactor is configured to impact the magnet in order to impart a pulse to the hammer via the magnet.

4. The striking mechanism according to claim 3, wherein a distance between the release position of the movable impactor and the magnet is chosen such that the magnet attracts the movable impactor in the impact position thereof.

5. The striking mechanism according to claim 3, wherein the momentum transmitted by the movable impactor overcomes a magnetic retaining force of the magnet acting on the hammer, such that the hammer detaches from the magnet and strikes the resonant element.

6. The striking mechanism according to claim 1, further comprising a flexible guide on which the hammer is mounted to allow the hammer to move between the rest position thereof and the strike position thereof.

7. The striking mechanism according to claim 1, wherein the actuation system comprises a flexible guide on which the movable impactor is mounted to enable the impactor to move between the release position and the impact position.

8. The striking mechanism according to claim 6, wherein the flexible guide includes a flexible strip or a flexible neck.

9. The striking mechanism according to claim 1, wherein the actuation system comprises a rotary device equipped with the movable impactor, the rotary device being configured to bring the movable impactor into the release position.

10. The striking mechanism according to claim 6, wherein the moveable impactor is provided in a plurality and arranged on a rotary device, so as to alternately bring each of the plurality of movable impactors into the release position.

11. The striking mechanism according to claim 9, wherein the rotary device comprises a hub.

12. The striking mechanism according to claim 9, wherein the rotary device comprises at least one arm, and

- wherein the moveable impactor is provided in a plurality and each arm bears a movable impactor of the plurality of moveable impactors.

13. The striking mechanism according to claim 11, wherein the rotary device comprises a plurality of arms angularly distributed around the hub.

14. A horological movement, comprising a striking mechanism, wherein the striking mechanism comprises:

- at least one resonant element enabling a sound to be emitted when struck;
- a hammer movable between a rest position and a strike position at which the hammer strikes the resonant element in order to cause the resonant element to vibrate;
- a system for actuating the hammer including a movable impactor configured to move from a release position to an impact position, in which the impactor at least partially transmits momentum thereof to the hammer to move the hammer from the rest position to the strike position in order to cause the resonant element to vibrate; and
- a magnet which is fixed relative to the horological movement, the magnet being configured to attract the movable impactor into the impact position.

* * * * *